Patented Sept. 24, 1946

2,408,345

UNITED STATES PATENT OFFICE 2,408,345

COMPOSITION OF MATTER AND METHOD

Robert S. Shelton, Mariemont, and Marcus G. Van Campen, Jr., Deer Park, Ohio, assignors to The Wm. S. Merrell Company, Cincinnati, Ohio, a corporation of Ohio No Drawing. Application April 13, 1942, Serial No. 438,728

8 Claims. (Cl. 260—570.8)

This invention relates to novel chemical compounds, methods of making the same, and to pharmaceutical preparations in which one or more of said compounds is an active ingredient.

One object of the invention is to produce novel chemical compounds useful as pharmaceuticals and as intermediates for manufacture of other chemicals.

Another object of the invention is to provide effective vasopressor compositions having little or no stimulating effect.

Another object of the invention is to provide a method of synthesizing alpha di-substituted ethane amines, and particularly beta-phenyl-alpha-alpha-dimethyl-alpha-amino ethane (alpha-benzyl isopropylamine).

It has been known heretofore that many substituted derivatives of beta-phenyl-alpha-amino ethanes, are active pharmaceutical compounds exhibiting vasopressor or vasodilator, mydriatic, sympathomimetic, and/or central stimulant properties in varying degrees. In many cases it is desirable to produce one of these effects without others; thus, in particular it is frequently desirable in cases of common cold and hay fever to shrink the nasal mucosa by application of a vasoconstrictor composition, whereas, any accompanying central stimulant effect may be quite undesirable, particularly as it interferes with sleep.

By the present invention we have made available a vaso-pressor amine of the substituted beta-phenyl-amino ethane type which has extraordinarily good activity and duration as a vasopressor, mydriatic, etc., but with only slight central stimulant effect.

In our efforts to test this, however, we were faced with great difficulty in that none of the common reactions used for producing other amines of this general class proved satisfactory for production of this particular amine.

Analogous chlorides could be made but, presumably due to stearic hindrance from the methyl groups on the alpha carbon atom, the chloride could not be converted to the amine by ordinary methods. Also the beta-phenyl-beta-hydroxy-alpha-alpha-di-methyl-alpha-amino ethane is known and is commercially available. This product can be made, for example, by condensation of benzylaldehyde with nitropropane and reduction of the resulting nitro compound to the corresponding amino compound, but it had not proven practical to directly eliminate the hydroxy group.

We have now discovered that the desired beta-phenyl-alpha-alpha-dimethyl-alpha-amino ethane compound can be made by catalytic reduction of the corresponding chloro compound, beta-phenyl-beta-chloro-alpha-alpha-dimethyl-alpha-amino ethane, advantageously in the presence of an alkali adapted to react with the chlorine released from such compound by the reduction.

Surprisingly, the resulting compounds, whether as free amine or in the form of the non-toxic salts, have proven to be relatively inactive as central stimulants but very valuable as a vasopressor; and thus, surprisingly, the synthesis of this compound supplies an important need for a vasopressor with only slight central stimulant effect.

Although we are giving below certain specific examples of our invention and its application in practical use and are giving also certain modifications and alternatives, it should be understood that these are not intended to be exhaustive nor limiting of the invention. On the contrary we are giving these as illustrations and are giving herewith explanations in order fully to acquaint others skilled in the art with our invention and the principles thereof and a suitable manner of its application in practical use, so that others skilled in the art may be enabled to modify the invention and to adapt it and apply it in numerous forms, each as may be best suited to the requirements of a particular use.

I. As an example of the use of these materials a composition particularly suitable for use as a nasal inhalant may be made as follows:

| | Parts |
|---|---|
| Menthol | 1 |
| Camphor | 1 |
| Beta-phenyl-alpha-alpha-dimethyl-alpha-amino-ethane (as the free amine) | 8 |

The camphor and menthol are dissolved in the amine and the solution applied to a pledget of cotton and placed in an inhaler device. The proportions of menthol and camphor may be varied rather widely and they may be replaced by other suitable aromatic or mixture of aromatic substances such as eucalyptol, oil of lavender, oil of rose, etc. Likewise, the proportion of the amine may be increased or decreased substantially.

II. A suitable material for use as aqueous base nose drops may be made as follows:

| | Per cent |
|---|---|
| Beta-phenyl-alpha-alpha-dimethyl-alpha amino ethane (calculated as free amines) | ½ |
| Molecular equivalent of inorganic or organic acid such as hydrochloric, sulfuric, lactic, gluconic, isoasorbic, levulinic and the like. | |
| Cetyl pyridinium chloride | 0.033 |
| Aromatics | 0.05 |
| Sorbitol | 4 |
| Distilled water, q. s. | |

We prefer to use organic acid salts rather than mineral acid salts, since in general they are less irritating. The sorbitol in this composition serves to make the product isotonic and should be in amount adjusted to effect that result. The pH of the solution is adjusted to approximately 7. The surface tension of the material is approximately 34.5 dynes per sq. centimeter.

III. A suitable composition for use as an oil base nose drop may be made as follows:

| | Parts |
|---|---|
| Beta-phenyl-alpha-alpha-dimethyl-alpha-amino ethane | 0.5 |
| Oil of eucalyptus | 1.0 |
| Mineral oil | 98.5 |

The free amine may be used in this composition or any of its oil soluble, e. g., fatty acid, salts, such as the oleate, palmitate, etc. The oil of eucalyptus may, of course, be replaced by other aromatics commonly used in nose drops, such as varying proportions of menthol, camphor, thymol, etc., and the mineral oil may be replaced by a vegetable oil such as peanut oil, cottonseed oil, sesame oil, etc.

IV. A nasal jelly may be prepared as follows:

| | Per cent |
|---|---|
| Beta-phenyl-alpha-alpha-dimethyl-alpha-amino ethane | 0.5 |
| Cetyl pyridinium chloride | 0.1 |
| Tragacanth | 1.0 |
| Glycerine | 15.0 |
| Methyl salicylate | 0.005 |
| Eucalyptol | 0.005 |
| Oil dwarf pine needles | 0.005 |
| Distilled water | 83.25 |

V. For internal administration the compound may be included in tablets of suitable composition, for example:

Beta-phenyl-alpha-alpha-dimethyl-alpha-amino ethane\_\_\_\_mgs. per tablet\_\_ 25

Mixed in a base consisting of approximately:

| | Parts |
|---|---|
| Milk sugar | 50 |
| Cornstarch | 5 |
| Talc | 1 |
| Stearic acid | 1 |
| Acacia | 10 |

And compressed into an uncoated tablet of approximately 2.8 grains.

Instead of compounding the amine in a tablet base it may be added to a suitable syrup or other vehicle for internal administration.

As will be appreciated from the above the use of this amine compound is very similar to other vasopressor amines and in general may be used in the same manner. Those skilled in the art will have no difficulty in utilizing it in widely different types of compositions and substituting it in such compositions for previously used amines of this general class.

The corresponding secondary amine is similarly valuable for the same purposes.

The following example will illustrate a method of preparing this compound in accordance with my invention although, as will be evident to those skilled in the art, various equivalent substances may be used in place of those mentioned and various equivalent procedures may be used instead of the particular steps described:

*Preparation of beta-phenyl-beta-chloro-alpha-amino-alpha-alpha-di-methyl ethane hydrochloride*

A mixture of equal parts by weight of beta-phenyl-beta-hydroxy-alpha-amino-alpha-methyl propane hydrochloride and thionyl chloride are allowed to stand at ordinary temperature (25–35° C.) for 10 to 15 hours, then warmed to 70° C. The solid which results is then powdered and washed with 200 to 300 cc. of ligroin, and finally dried over soda lime. The resulting beta-phenyl-beta-chloro-alpha-amino-alpha-methyl-propane hydrochloride is about 95% pure and is often satisfactory for use in the next step, but is advantageously purified before further use. For purification 60 parts of the crude material is dissolved in 120 parts of hot alcohol and poured into 360 parts of ether, cooled, and the pure hydrochloride salt filtered and dried. The yield of purified material is about 80% of the theory.

*Preparation of beta-phenyl-alpha-amino-alpha-alpha-dimethyl*

15 parts of the above beta-phenyl-beta-chloro-alpha-amino-alpha-alpha-dimethyl ethane hydrochloride, are dissolved in 150 parts of alcohol, and 5 parts of palladinized calcium carbonate added. The mixture is then reduced in a conventional hydrogenation apparatus with hydrogen at 50–80° C. and under 50 lbs. pressure. When hydrogen is no longer readily absorbed, the solution is removed, the palladinized calcium carbonate filtered and the filtrate evaporated. The residue is dissolved in dilute hydrochloric acid, shaken with ether and the ether discarded. The acid solution is then made alkaline, as with sodium hydroxide, and the amine extracted with ether. The ether solution may (1) be dried and distilled to give the desired $\alpha$-benzyl isopropyl amine, B. P. 205° at 750 mm. or 100° at 21 mm. or (2) the ether solution may be dried and saturated with hydrogen chloride and the precipitated hydrochloride recrystallized from a mixture of 50 parts alcohol and 100 parts of acetone. The pure hydrochloride is thus obtained as a white crystalline substance in yields 60% of the theoretical and having a M. P. of 195–196° C. unc.

Other halogeno compounds may be used instead of the chloro compound.

Instead of palladinized calcium carbonate other hydrogenation catalysts may be used. Palladium and/or platinum absorbed on a basic carrier such as an alkaline earth oxide or carbonate (especially calcium or magnesium) gives the best yield of the substituted phenyl-ethane. Platinum and platinum oxide (Adams), alone, palladium on charcoal, and Raney nickel may also be employed, but the yield of the beta-phenyl-alpha-alpha-dimethyl-alpha-amino ethane compound is a smaller portion of the total product, while at the same time there is produced a substantial yield of the novel product, beta-cyclohexyl-alpha-alpha-dimethyl-alpha-amino ethane.

Accordingly, regardless of which of two types of catalysts is employed, the method is utilizable for the production of a beta-cyclo-alpha-alpha-dimethyl-amino ethane, a catalyst of the former type being chosen when the "cyclo" radical is to be kept as an unsaturated nucleus and the latter type being suitable when it is desired to saturate the ring.

The solution during hydrogenation should not be sufficiently alkaline to remove the hydrochloric acid from the amine group as that would permit the amino-ethane compound to react with itself.

As indicated above and as generally recognized with the class of vasopressor amines they may be used either as free amines or as amine salts and as primary or secondary amines.

What is claimed is:

1. The method of preparing beta-phenyl-alpha-alpha-dimethyl-amino ethane and the amine salts thereof which comprises hydrogenating the corresponding beta-phenyl-beta-chloro-alpha-alpha-dimethyl-amino ethane compound in solution in the presence of a catalytic metal of the class consisting of platinum and palladium absorbed on a basic carrier.

2. The method of preparing beta-phenyl-alpha-alpha-dimethyl-amino ethane and the amine salts thereof which comprises hydrogenating beta-phenyl-beta-chloro-alpha-alpha-dimethyl-amino ethane hydrochloride in solution in the presence of palladium absorbed on magnesium carbonate.

3. The method of preparing beta-phenyl-alpha-alpha-dimethyl-amino ethane and the amine salts thereof which comprises hydrogenating beta-phenyl - beta - chloro - alpha - alpha - dimethyl-amino-ethane hydrochloride in solution in the presence of palladium absorbed on calcium carbonate.

4. The method of preparing beta-phenyl-alpha-alpha-dimethyl-alpha-amino ethane and the amine salts thereof which comprises hydrogenating the corresponding beta-phenyl-beta-beta-chloro-alpha-methyl-alpha-amino propane at elevated temperature and pressure in alcoholic solution in the presence of palladinized calcium carbonate dispersed therein.

5. The method of preparing beta-phenyl-alpha-alpha-alpha-amino ethane and the amine salts thereof which comprises hydrogenating beta-phenyl-beta-chloro-alpha-methyl - alpha - amino propane at a temperature between about 50–80° C. and a hydrogen pressure about 50 lbs. per square inch and in alcoholic solution with finely divided palladinized calcium carbonate dispersed therein.

6. The method of preparing beta-phenyl-beta-chloro-alpha-alpha-dimethyl-amino ethane and the amine salts thereof which comprises mixing a corresponding beta-phenyl-beta-hydroxy-alpha-alpha-dimethyl-amino ethane compound and thionyl chloride, allowing the same to react, warming, washing, and drying.

7. Beta-phenyl-alpha-alpha-dimethyl - alpha-amino ethane.

8. Beta-phenyl-alpha-alpha-dimethyl - alpha-amino ethane and the salts thereof.

ROBERT S. SHELTON.
MARCUS G. VAN CAMPEN, Jr.

Certificate of Correction

Patent No. 2,408,345. September 24, 1946.

ROBERT S. SHELTON ET AL.

It is hereby certified that errors appear in the printed specification of the above numbered patent requiring correction as follows: Column 4, line 37, after "alpha-dimethyl" insert *ethane*; column 6, line 9, claim 4, after "phenyl-" strike out *beta-*; line 15, claim 5, for "alpha-alpha" read *alpha-dimethyl-alpha*; and that the said Letters Patent should be read with these corrections therein that the same may conform to the record of the case in the Patent Office.

Signed and sealed this 8th day of April, A. D. 1947.

[SEAL]

LESLIE FRAZER,
*First Assistant Commissioner of Patents.*